US010460606B2

(12) United States Patent
Guarneri et al.

(10) Patent No.: US 10,460,606 B2
(45) Date of Patent: Oct. 29, 2019

(54) METHOD AND SYSTEM FOR GENERATING A LANE DEPARTURE WARNING IN A VEHICLE

(71) Applicant: STMicroelectronics S.r.l., Agrate Brianza (IT)

(72) Inventors: Nunziata Ivana Guarneri, Caltanissetta (IT); Arcangelo Ranieri Bruna, Giardini Naxos (IT)

(73) Assignee: STMICROELECTRONICS S.R.L., Agrate Brianza (IT)

(*) Notice: Subject to any disclaimer, the term of this patent is extended or adjusted under 35 U.S.C. 154(b) by 175 days.

(21) Appl. No.: 15/639,623

(22) Filed: Jun. 30, 2017

(65) Prior Publication Data
US 2018/0190122 A1    Jul. 5, 2018

(30) Foreign Application Priority Data
Dec. 30, 2016 (IT) ................. 102016000132670

(51) Int. Cl.
*G06K 9/00* (2006.01)
*G08G 1/16* (2006.01)
(Continued)

(52) U.S. Cl.
CPC ......... *G08G 1/167* (2013.01); *G06K 9/00798* (2013.01); *G06K 9/48* (2013.01);
(Continued)

(58) Field of Classification Search
CPC .. G06K 9/00798; B62D 15/029; G08G 1/167; G06T 7/246; G06T 7/60
(Continued)

(56) References Cited

U.S. PATENT DOCUMENTS 7,583,816 B2    9/2009  Kakinami et al.
8,279,280 B2   10/2012  Kim
(Continued)

FOREIGN PATENT DOCUMENTS

| EP | 2477139 A2 | 7/2012 |
|----|------------|--------|
| EP | 2759959 A2 | 7/2014 |
| WO | 2008091565 A1 | 7/2008 |

OTHER PUBLICATIONS

Lee, Joon Woong, "A Machine Vision System for Lane-Departure Detection", Computer Vision and Image Understanding, vol. 86, No. 1, Apr. 1, 2002, pp. 52-78, XP055157742.

(Continued)

*Primary Examiner* — Charlotte M Baker
(74) *Attorney, Agent, or Firm* — Slater Matsil, LLP

(57) ABSTRACT

Method for generating a lane departure warning in a vehicle, comprising acquiring a plurality of frames of a digital image of a road on which the vehicle is running, the digital image of a road including the image of a lane within which the vehicle is running and of marking lines of the lane, for each of the acquired frames, extracting edge points of the frame, analyzing the edge points to evaluate a lane departure status, the evaluation including performing a lane departure verification procedure including identifying in the frame points representative of the position of the lane marking lines, generating a lane departure alert if a lane departure status is detected by the lane departure verification procedure. In the described method, the lane departure verification procedure includes comparing the position of the points to reference positions of the lane, the reference positions of the lane being obtained by a lane calibration procedure performed on a set of acquired frames, the lane calibration procedure including filtering edge points of the image frame belonging (Continued)

to an area of a horizontal stripe of the frame including a plurality of rows of the frame.

19 Claims, 11 Drawing Sheets

(51) Int. Cl.
    *G06T 7/13*     (2017.01)
    *G06T 7/174*     (2017.01)
    *G06K 9/48*     (2006.01)

(52) U.S. Cl.
    CPC .............. *G06T 7/13* (2017.01); *G06T 7/174* (2017.01); *G06K 2009/487* (2013.01); *G06T 2207/10016* (2013.01); *G06T 2207/30256* (2013.01)

(58) Field of Classification Search
    USPC .............. 382/103, 104, 199; 358/464, 474; 348/148, E7.085, 149; 701/1
    See application file for complete search history.

(56) References Cited

U.S. PATENT DOCUMENTS

| | | | |
|---|---|---|---|
| 8,520,954 B2 * | 8/2013 | Suzuki | G06K 9/00 358/464 |
| 8,594,890 B2 | 11/2013 | Imai et al. | |
| 10,102,435 B2 * | 10/2018 | Yang | B60R 1/00 |
| 2011/0115912 A1 * | 5/2011 | Kuehnle | G06K 9/00798 348/148 |

OTHER PUBLICATIONS

Chang, Tang-Hsien, et al., "A Vision-Based Vehicle Behavior Monitoring and Warning System", Intelligent Transportation System, IEEE, vol. 1, Oct. 12, 2003, pp. 448-453, XP010673609.

Jung, Claudio Rosito, et al. "A Lane Departure Warning System Using Lateral Offset with Uncalibrated Camera", 8th International IEEE Conference on Intelligent Transportation Systems, Sep. 13-16, 2005, pp. 348-353, XP010843048.

\* cited by examiner

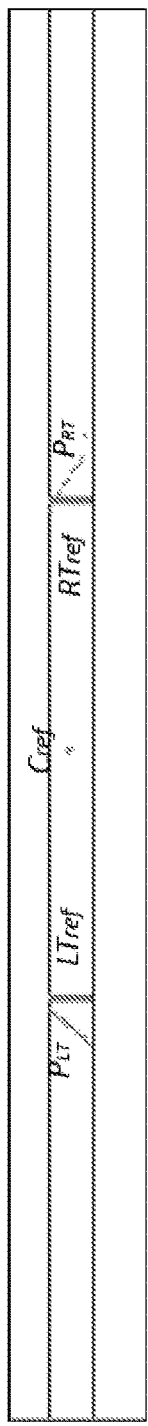
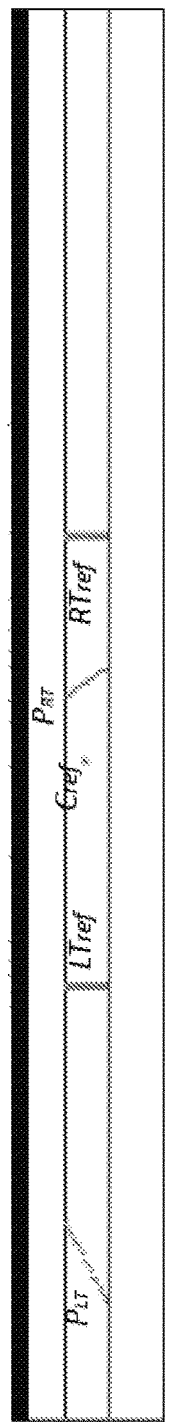
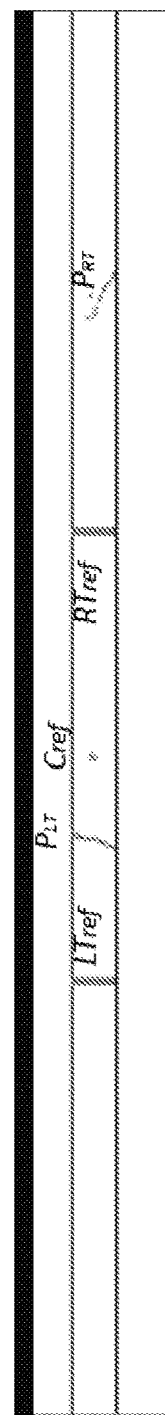
Fig. 10A)
Fig. 10B)
Fig. 10C)

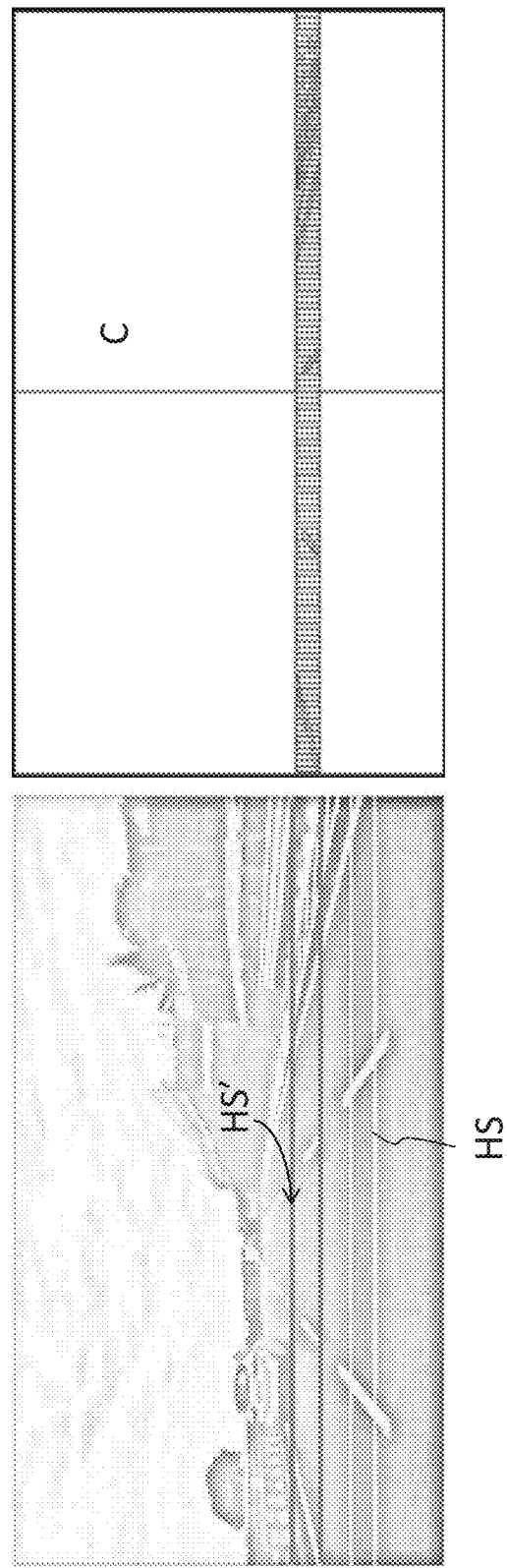

METHOD AND SYSTEM FOR GENERATING A LANE DEPARTURE WARNING IN A VEHICLE

CROSS-REFERENCE TO RELATED APPLICATIONS

This application claims priority to Italian Patent Application No. 102016000132670, filed on Dec. 30, 2016, which application is hereby incorporated herein by reference.

TECHNICAL FIELD

Embodiments of the present disclosure relate to a method and system for generating a lane departure warning in a vehicle.

BACKGROUND

In automotive applications, the Lane Departure Warning System (LDW) is a system included in the Smart Driving application or one of the Advanced Driver Assistance Systems (ADAS). It can help the driver to avoid accidents; in particular, it alerts the driver if the vehicle is inadvertently leaving the lane.

Today the ADAS applications are widely diffused due to the high sensibility in the automotive industry for the Safety Driving. The success of these applications is also due to the fact that a growing number of manufactures produce sensor chip really performing.

The LDW is a safety feature which lets the driver know if he is beginning to drift from lane either due to inattention or drowsiness.

Solutions are known to implement a LDW function.

European patent document EP 2477139 A2 discloses a method which provides extracting image edges from an image of the road acquired through a camera and emphasizing edge components by the histogram analysis stretching. Subsequently straight-line components are detected in the edge components the through the Hough transform.

U.S. Pat. No. 8,279,280 discloses that, in order to detect lane dividing lines, for example, an edge filter, a lane-dividing line highlight filter, etc. may be used. Preferably, the edge filter is suitably configured to detect a portion constituting a boundary in the image using a difference in the brightness values of respective pixels arranged in X and Y directions in an image coordinate system. The pitch angle between the road and the camera is calculated using the results of detection of the left and right lane-dividing lines, a vanishing point at which the left and right lane dividing lines suitably intersect, and a reference value required for the calculation of the lane width changes according to the location of the vanishing point.

U.S. Pat. No. 8,594,890 discloses a method for generating lane departure warning that include extracting from digital images the lane marking lines position based on the analysis of the image brightness changes. A couples of points where the brightness changes abruptly from dark to bright and a couple of points where the brightness changes abruptly from bright to dark are identified in the image. The marking lines can be detected by finding a combination of such points. The marking lines position is used for estimating the probability of lane departure calculating the position of parts of the vehicle using other information such as information on the steering, such as the yaw rate and the lateral acceleration.

The drawback of the technique is that requires taking in account inputs from different sensors besides the camera and parameters which are vehicle-specific.

SUMMARY

Embodiments of the present disclosure relate to solutions concerning a method for generating a lane departure warning in a vehicle. The method includes acquiring a plurality of frames of a digital image of a road on which the vehicle is running. The digital image of a road includes the image of a lane within which the vehicle is running and of marking lines of the lane. For each of the acquired frames, edge points of the frame are extracted and analyzed to evaluate a lane departure status. The evaluation includes performing a lane departure verification procedure that includes identifying in the frame points representative of the position of the lane marking lines, and generating a lane departure alert if a lane departure status is detected by the lane departure verification procedure.

According to one or more embodiments, one or more advantages are achieved by a method for generating a lane departure warning in a vehicle. Embodiments moreover concern a related system as well as to a computer program product that can be loaded into the memory of at least one computer (e.g., a terminal in a network) and comprises portions of software code suitable for carrying out the steps of the method when the program is run on at least one computer. As used herein, the above-mentioned computer program product is understood as being equivalent to a computer-readable medium containing instructions for control of the computer system so as to co-ordinate execution of the method according to the invention. Reference to "at least one computer" is meant to highlight the possibility of the present invention being implemented in a modular and/or distributed form.

As mentioned before, the present disclosure relates to a method for generating a lane departure warning wherein the lane departure verification procedure includes comparing the position of the points to reference positions of the lane, the reference positions of the lane being obtained by a lane calibration procedure performed on a set of acquired frames. The lane calibration procedure includes filtering edge points of the image frame belonging to an area of a horizontal stripe of the frame including a plurality of rows of the frame.

In various embodiments, the lane calibration procedure includes a step of collecting data collecting the value and positions of the accumulating filtered edge points over the set of acquired frames and calculating a distribution of the filtered edge points along the width of the road, extracting an estimate of the marking lines position and marking line width from the distribution, calculating the reference positions of the lane as a function of the estimate of the marking lines position, and marking line width temporally averaged over the number of frames in the set of acquired frames.

In various embodiments, the lane calibration procedure includes a first lane calibration procedure performed on a given number of acquired frames.

In various embodiments, the described method includes performing a lane calibration procedure updating the reference positions of the lane obtained by the lane calibration procedure if no lane departure status s detected for a given recalibration time.

In various embodiments, the described method includes that the estimate of the marking lines position is obtained by taking the first non-null filtered edge points to the left and right of a center of the stripe.

In various embodiments, the marking line widths are obtained by counting the adjacent filtered edge points which are not null.

In various embodiments, collecting the data includes dividing the horizontal stripe in a plurality of vertical sectors of a given width and associating each vertical sector to a respective index, calculating the number of filtered edge points in each vertical sector, and obtaining the estimate of the marking lines position taking the first non-null filtered edge points to the left and right of a center of the stripe including taking the index of the identified first left and right sector as estimate of the marking lines position. The step of obtaining the marking line widths by counting the adjacent filtered edge points which are not null includes calculating a number of sectors adjacent to the first non-null sector having a non-null number of filtered edge points. The calculating of the reference positions of the lane includes calculating as a function of the estimate of the marking lines position and marking line width temporally averaged over the given number of frames and also of the given width of the sectors.

In various embodiments, the described method includes that the lane departure verification procedure compares the position of the points to reference positions of the lane by estimating a center of the reference lane on the basis of the reference positions, selecting among the filtered edge points two edge points with respect to the center of the reference lane as the first edge point to the right of the center of the reference lane and first edge point to the left of center of the reference lane to perform the lane departure verification, defining a left variable and right variable which combination define states of departure, in particular of no lane departure, left lane departure and right lane departure of the vehicle, evaluating for all the rows of the stripe a plurality of conditions which are function of the center of the reference lane, first edge point to the right and previous state of departure setting the new value of the left variable and right variable according to the number of rows satisfying the conditions, evaluating a new lane departure status.

The present disclosure relates also to a system for generating a lane departure warning in a vehicle. At least a video camera is configured to acquire a plurality of frames of a digital image of a road on which the vehicle is running. The digital image of the road includes the image of a lane within which the vehicle is running and of marking lines of the lane. A microprocessor module is configured to, for each of the acquired frames, extract edge points of the frame, and analyze the edge points to evaluate a lane departure status. The evaluation includes performing a lane departure verification procedure including identifying in the frame points representative of the position of the lane marking lines, and generating a lane departure alert if a lane departure status is detected by the lane departure verification procedure. The microprocessor module is configured for performing the method according to the embodiments indicated above.

In various embodiments, the system described includes a module configured to generate the alert as a vibration signal or an acoustic signal or a light signal.

The present disclosure relates also to a computer program product that can be loaded into the memory of at least one computer, the computer program product comprising portions of software code for implementing the method according the embodiments indicated above.

BRIEF DESCRIPTION OF THE DRAWINGS

Embodiments of the present disclosure will now be described with reference to the annexed drawings, which are provided purely by way of non-limiting example and in which:

FIGS. 10A, 10B, 10C shows portion of digital image on which are indicated markers used by the method here described;

FIGS. 12 and 13 show digital images employed by a variant of the method here described applied to multi-lane detection.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
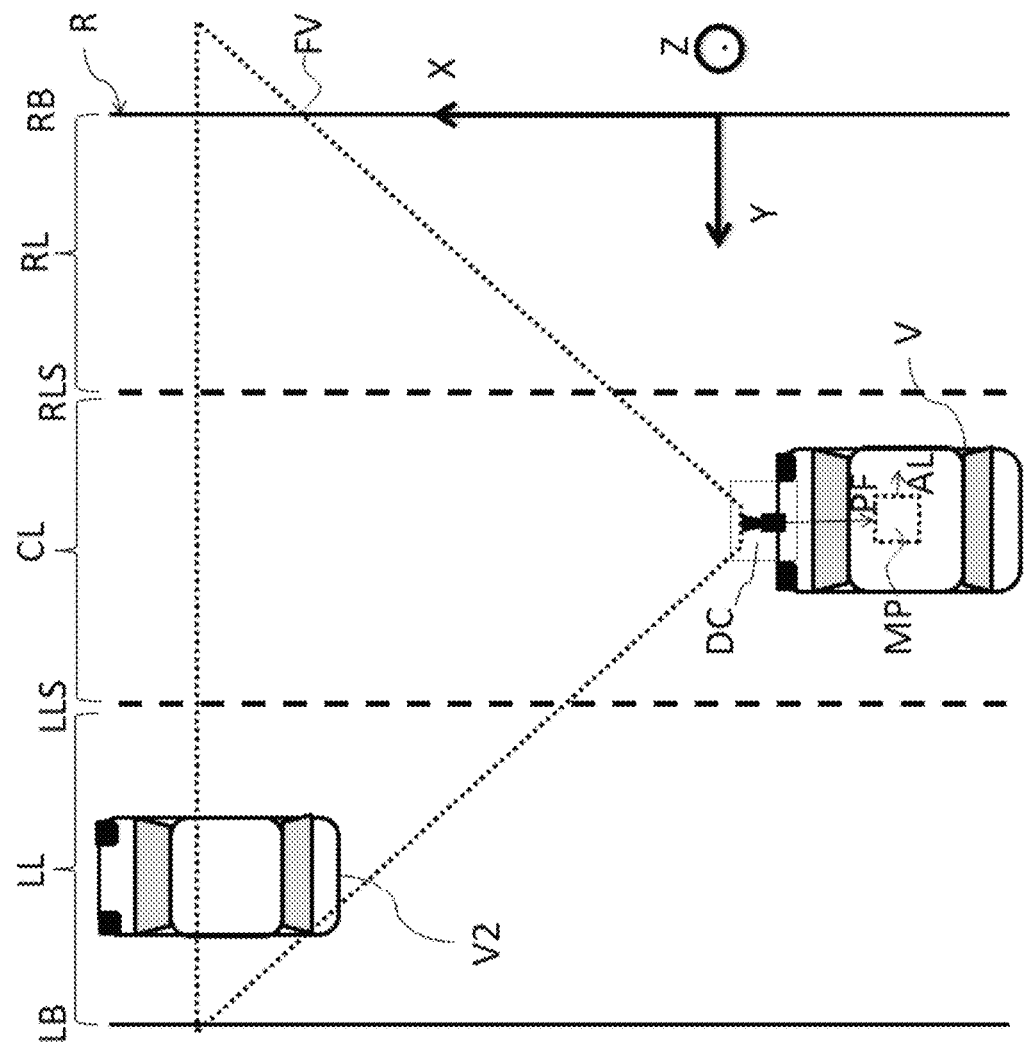
FIG. 1 is a schematic drawing showing a system implementing the method here described.

FIG. 1 shows a motor vehicle V, which is moving along a road R, which, in the example shown is a straight road developing in an advancement direction parallel to an axis X. With Y is then indicated an axis perpendicular to the axis Y, lying in the plane of the road R, while with Z is indicated an axis perpendicular to the plane of the road R, i.e., the plane XY. The road R is limited by a right boundary line RB and a left boundary line LB, parallel to the axis X. The road R is divided in three lanes, a right lane RL, a central lane CL and a left lane LL by a right lane marking line RLS and left lane marking line LLS, i.e., white paint dashed strips, i.e., marking lines, parallel to the axis X and placed respectively at approximately one third and two thirds of the width of the road R so as to define the abovementioned three lanes RL, CL and LL. The motor vehicle V is shown as advancing in the central lane CL, which in the following will be the reference lane in which the vehicle V should remain, while a second vehicle V2 it is also shown in the left lane LL, ahead of the motor vehicle V.

The motor vehicle V is equipped with a video camera DC, which is placed in a position on the vehicle V so that a field of view FV of the camera DC embraces the whole width of the road R or at least a width greater than then distance between the right lane marking line RLS and the left lane marking line LLS. Therefore the camera DC is configured to take a plurality of image frames PF of a digital image of the road R and to send the corresponding sequence of image frames PF to a microprocessor module MP which is configured to acquire the sequence of image frames PF and to perform an analysis on the sequence of image frames PF and to generate a lane departure warning AL on the basis of such an analysis.

Figure 2:
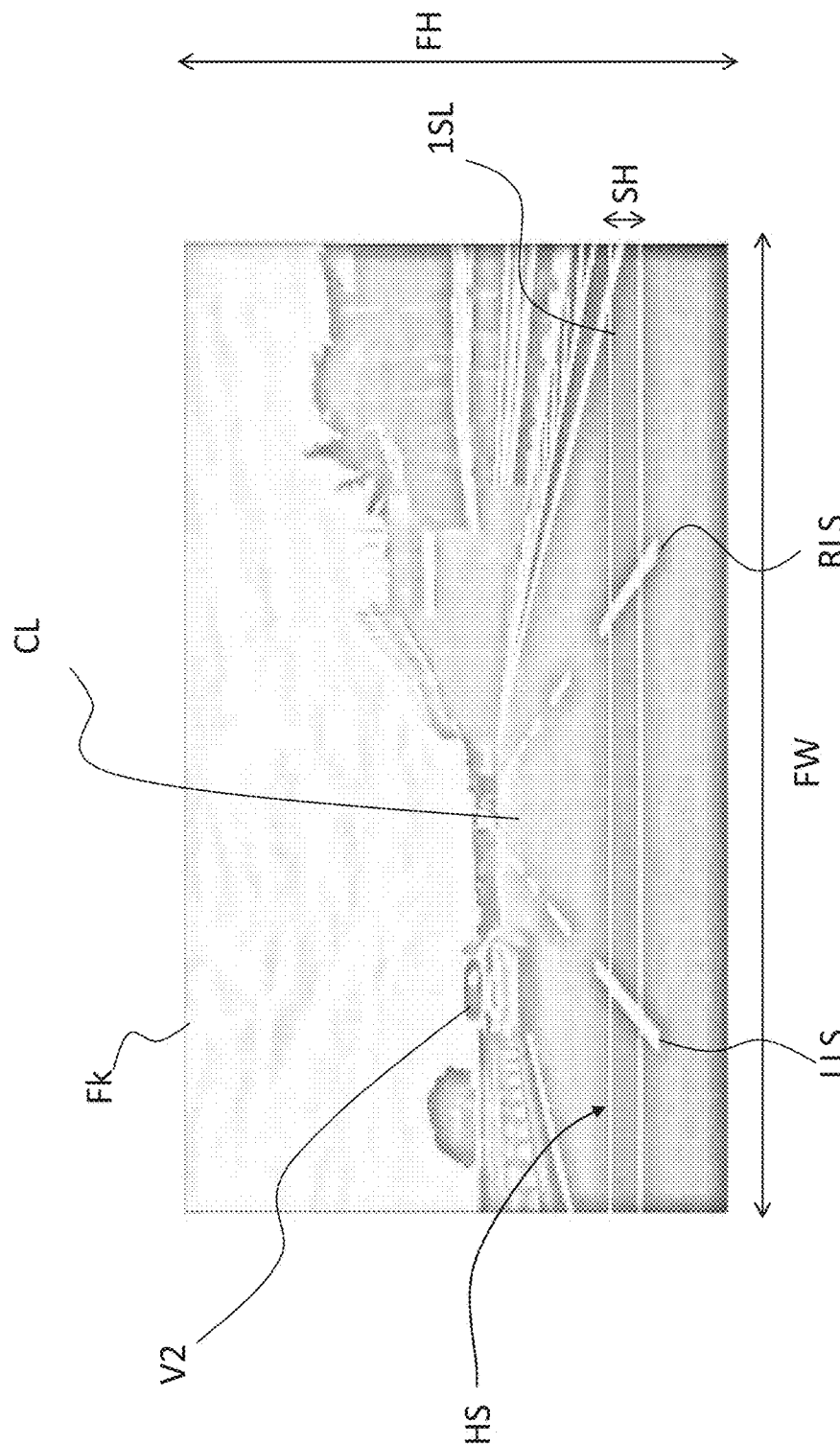
FIG. 2 shows a digital image acquired by such system.

FIG. 2 shows a k-th frame $F_k$ of the sequence of image frames PF, k being the index of a number N of frames $F_0 \ldots F_k \ldots F_{N-1}$ composing the sequence of image frames PF. The frame $F_k$ has a frame width FW and a frame height FH, for instance of 640 and 360 pixels respectively. As better detailed in the following, the method here described provides defining on the image frame $F_k$ a horizontal stripe HS, which in the example has a width equal to the frame width FW and a stripe height SH of 20 pixel, which is counted starting from a first stripe line 1SL, which represents the upper boundary of the horizontal stripe HS, and in the example shown in FIG. 2 is placed at row 280 of the 360 rows of pixels of the frame $F_k$.

Figure 3:
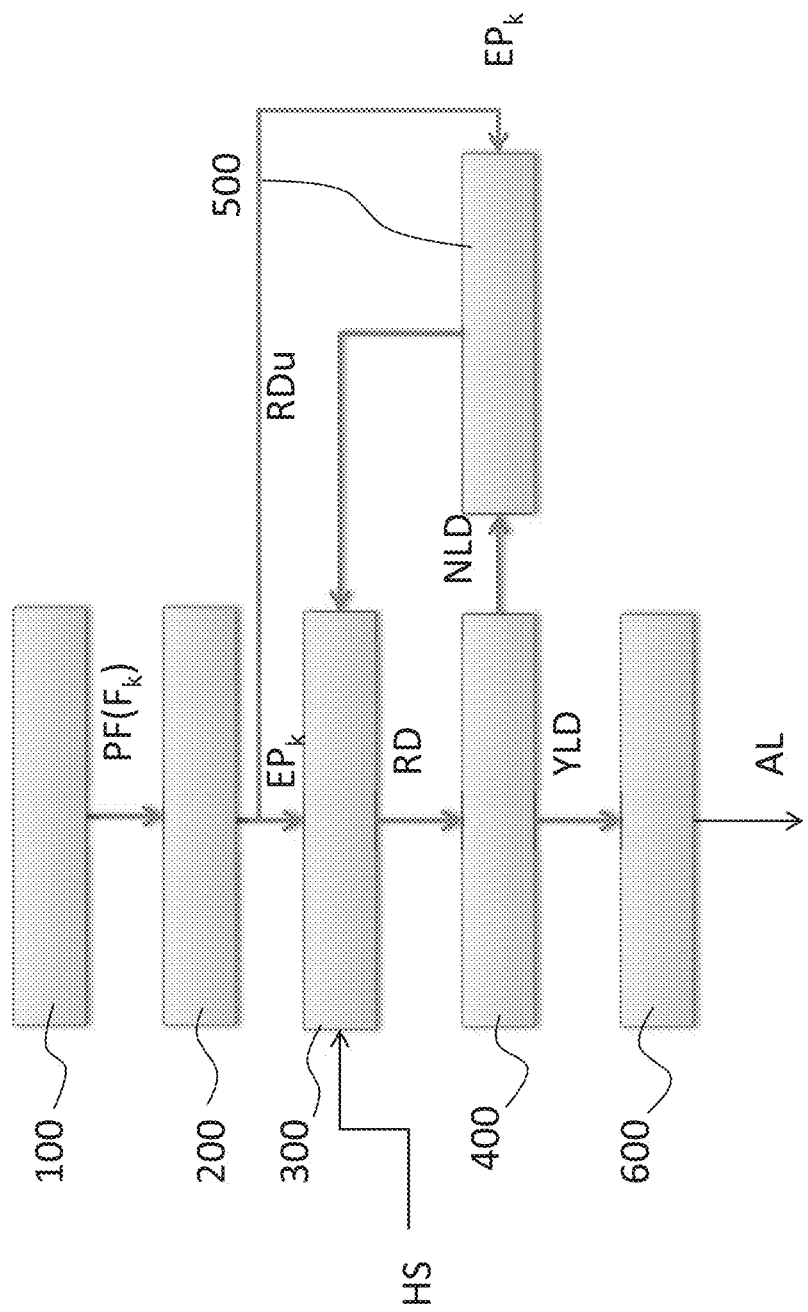
FIG. 3 shows a flow diagram illustrating the method here described.

FIG. 3 shows a flow diagram where with the numerical reference 100 is indicated the step of acquiring a sequence of frames PF by the microprocessor module MP through the camera DC.

Figure 4:
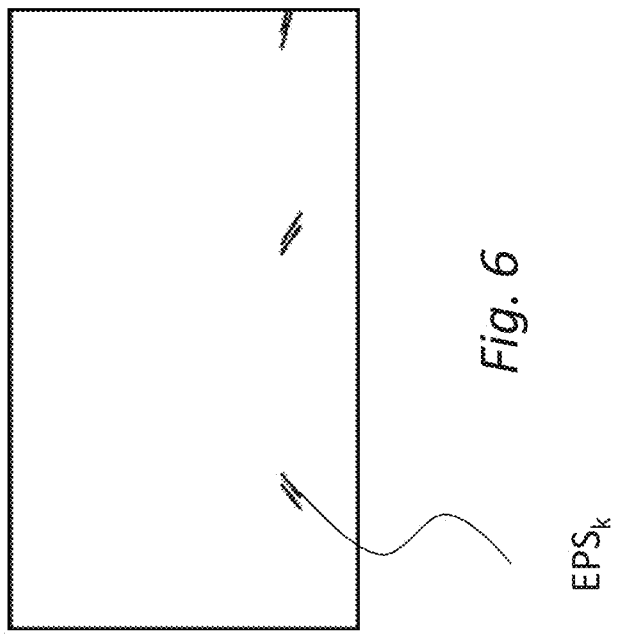
FIGS. 4 and 6 shows digital images processed according to different steps of the method here described.

With 200 is indicated a step of obtaining, for a given k-th frame $F_k$, corresponding edge points $EP_k$. The microprocessor module MP is configured to process each frame $F_k$ to obtain respective edge points $EP_k$, as shown in FIG. 4, i.e., identifying points in the digital image frame $F_k$ at which the image brightness changes sharply or, more formally, has discontinuities. The points at which the image brightness changes sharply are mostly organized into a set of curved line segments termed edges. By way of example, the microprocessor module MP comprises a STV0991 image processor containing an image reconstruction pipeline and Embedded Video Analytics, including, among others, a Edge/Line Detector, which can be used to obtain the edge points $EP_k$.

With 300 is indicated a subsequent first lane calibration procedure, which receives as input the edge points $EP_k$ of the k-th frame $F_k$ and data identifying the horizontal stripe HS for what regards its position in the frame $F_k$ (for instance through the value of the first stripe line 1SL) and size (for instance through the value of the stripe height SH, if the stripe width is the frame width FW, which is known). The first lane calibration procedure 300 outputs lane reference data RD, which are supplied to a lane departure verification procedure 400, which evaluates, on the basis of such lane reference data RD, if the vehicle is in a lane departure status YLD or not, i.e in a no lane departure NLD.

If the lane departure verification procedure 400 does not detect a lane departure status after the first lane calibration procedure, it is performed a lane re-calibration procedure 500, which outputs updated lane reference data RDu, which substitute the lane reference data RD brought as input of the lane departure verification procedure 400. If the lane departure verification procedure 400 detects a lane departure, issuing a lane departure status warning YLD (which can correspond to a left departure warning LLD or a right departure warning RLD, as better detailed in the following) it is performed a lane departure warning procedure 600, generating an alert AL.

Figure 5:
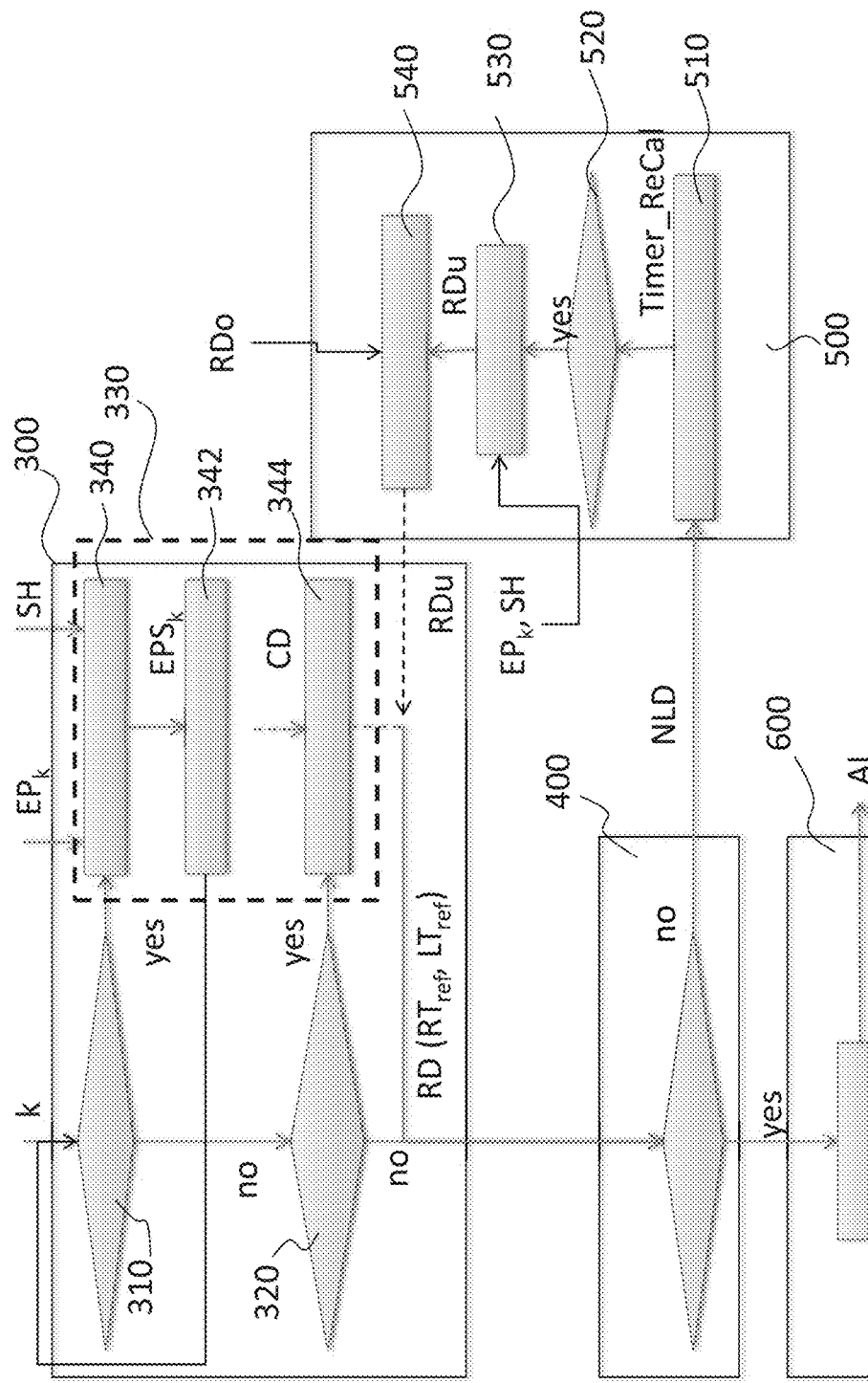
FIG. 5 shows a flow diagram detailing the flow diagram of FIG. 3.

In FIG. 5 it is represented a more detailed flow diagram where it is shown that the first lane calibration procedure 300 receives as input a frame number, i.e., the index k of the frame $F_k$ being processed, the corresponding filtered edge points $EP_k$, and the stripe HS data, i.e., the value of the first stripe line 1SL and the value of the stripe height SH, identifying the size and position in the frame $F_k$ of the rectangle corresponding to the stripe HS.

Figure 6:
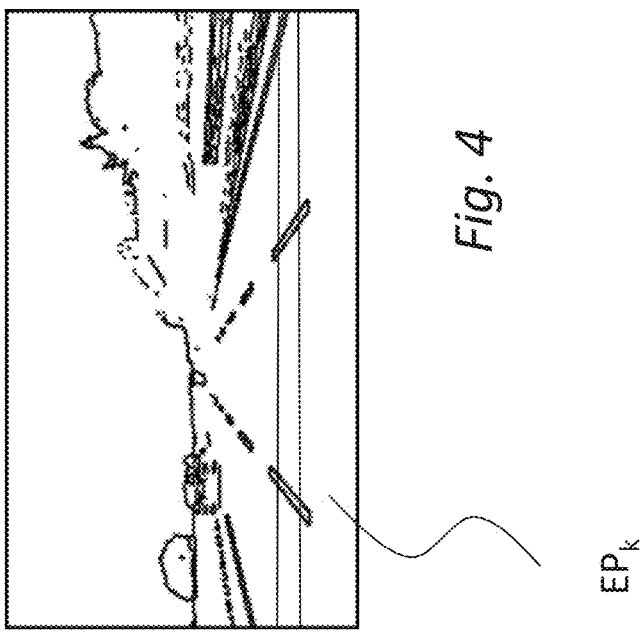

In a block 310 it is evaluated if the value of the index k is lower than a calibration threshold th_cal. In the affirmative, a edge points filtering operation 340 is performed which filters the edge points $EP_k$ of the k-th frame $F_k$ in function of the stripe HS image area, obtaining filtered edge points $EPS_k$, i.e., the edge points of the frame Fk which belongs to the area of the stripe HS, as better shown in FIG. 6. As mentioned, the stripe HS area is a pre-fixed area of the frame, defined through the first line number 1SL and the stripe height SH. The size of the stripe HS size can be changed according to the expected accuracy or sensibility of the method.

Then, after the edge points filtering operation 340, it is performed an operation 342 of collecting data in the stripe HS area, i.e., collecting the value and the position of the pixels forming the filtered edge points $EPS_k$, obtaining collected data CD. After each collection operation, control is given back to step 310 to evaluate a new frame $F_k$ till the frame number k remains lower than the calibration threshold th_cal. In other words, the collected data CD accumulate filtered edge points $EPS_k$ over a number of frames which is determined by the calibration threshold th_cal.

Figure 7:
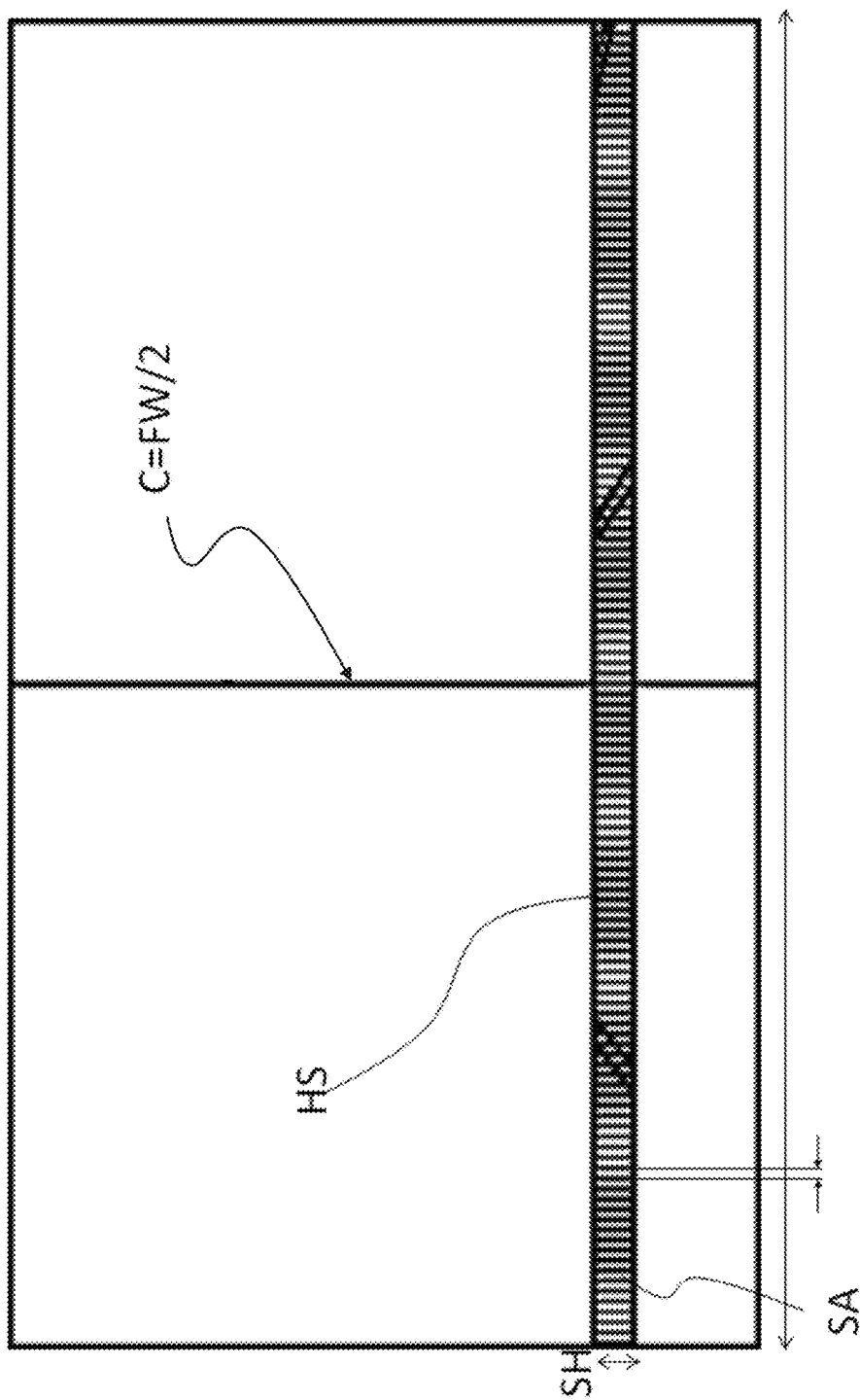
FIG. 7 shows a further digital image processed according to a further step of the method here described.
Figure 8:
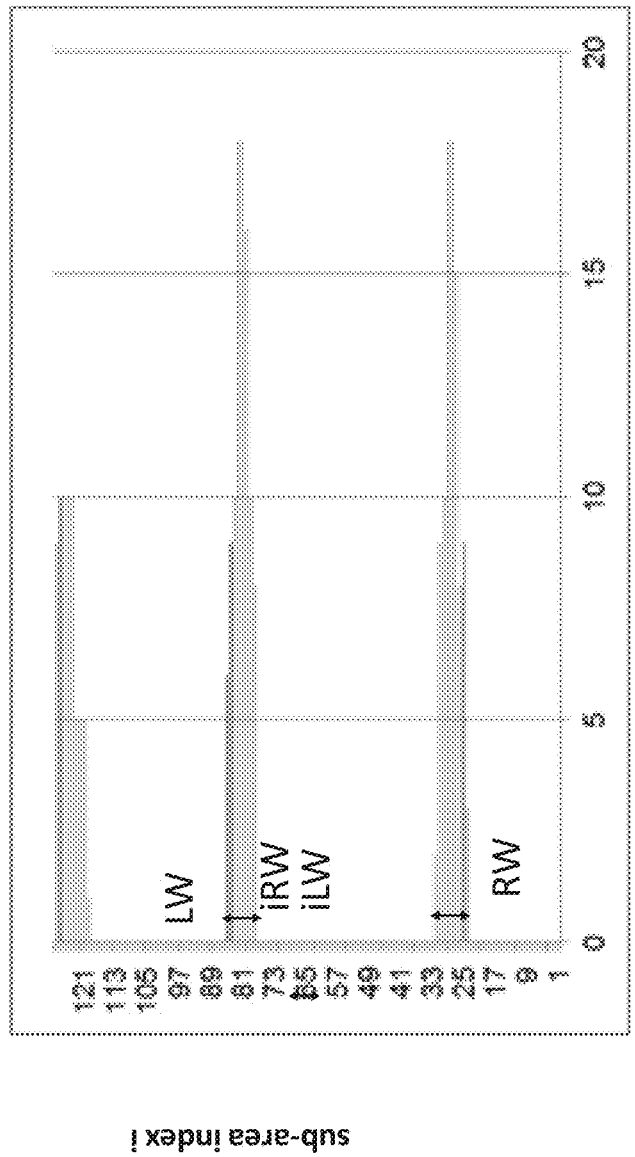
FIG. 8 shows an histogram illustrating data collected according to a step of the method here described.
Figure 9:
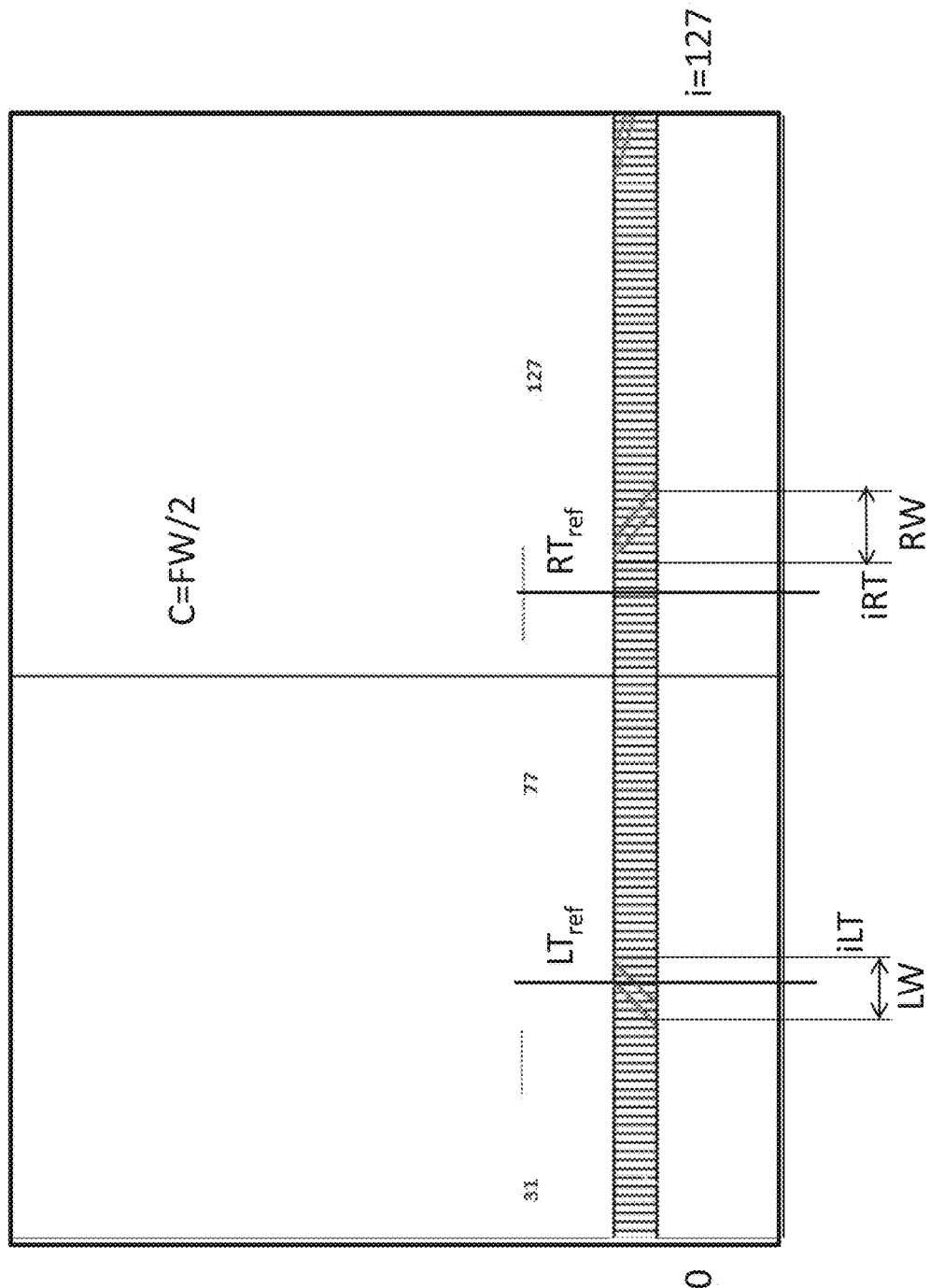
FIG. 9 shows a further digital image processed according to a further step of the method here described.

More in detail, such collection step 342 includes dividing the stripe HS area into a number n of sub-areas SA having a size SH×SS, where SH is the stripe height and SS is a horizontal step according to which the horizontal stripe HS is subdivided, in particular a number of columns, which is selected as parameter. The number n of sub-areas SA is therefore equal to the ratio of the frame width FW to the horizontal step SS, n=FW/SS, as shown in FIG. 7, where it can be appreciated the division in sub-areas SA by step SS of the stripe HS. Then, for each sub-area SA is evaluated the number of filtered edge points $EPS_k$ of the k-th frame $F_k$ which lay within such sub-area SA. In FIG. 8 it is shown a histogram where, given a progressive sub-area index i (vertical axis) associated to each sub-area $SA_i$ along the width of the frame starting from right, for each value of the sub-area index i it is shown a corresponding sum $EPC_i$ (horizontal axis) of the filtered edge points $EPS_k$, collected over a number of frames $F_k$ determined by the calibration threshold th_cal, in that i-th sub-area $SA_i$.

On the basis of the histogram of FIG. 8, i.e., the distribution of filtered edge points with respect to the sub-areas accumulated over a given number of frames, i.e., the calibration threshold th_cal, the collected data CD are calculated.

Indicating with C a central horizontal coordinate of the stripe area HS, C=FW/2, then two sub-area indexes are selected as follows. A right sub-area index iRT is selected as the sub-area index i of the first not null sum $EPC_i$ at the right side of the central point C, while a left index iLT is selected as the sub-area index i of the sub-area SAi of the first not null sum $EPC_i$ at the left side of the central point C.

Also a left width LW and right width RW of the left lane marking line LLS and right lane marking line RLS are evaluated by counting the adjacent sums of edge points which are not null. The left width LW and right width RW contribute to obtain a more accurate left and right lane margin positions. Therefore, the collected data CD include such values of right sub-area index iRT, left sub-area index iLT, left width LW and right width RW of the marking lines, which value varies with the accumulation of the edge points extracted from the digital image frame $F_k$. In FIG. 8 also these quantities are shown. In the example shown, the value of the stripe step SS is chosen 4 pixels (or columns), so that there are 128 sub-areas, index i ranging from 0 to 127. The value of the right sub-area index iRT in the example shown is 77, the value of the left sub-area index iLT is 33, the left width LW is 8 and the right width RW is 9.

The accumulated collected data CD are then used in a step 344 to generate lane reference data RD.

More in detail, in the step 344 of calculation of lane reference data RD, on the basis of the collected data CD, a calculation of a right and left reference lane position $LT_{ref}$ and $RT_{ref}$ is performed.

First the two indexes iRT and iLW and the relative widths RW, LW are temporally averaged obtaining two averaged indexes $iRT_{avg}$ and $iLW_{avg}$ and relative averaged widths $RW_{avg}$, $LW_{avg}$.

$$iLT_{avg} = \sum_{k=0}^{th_{cal}} \frac{iLT_k}{th_{cal}}$$

$$iRT_{avg} = \sum_{k=0}^{th_{cal}} \frac{iRT_k}{th_{cal}}$$

$$LW_{avg} = \sum_{k=0}^{th\_cal} \frac{iLW_k}{th\_cal}$$

$$iRW_{avg} = \sum_{k=0}^{th\_cal} \frac{iRW_k}{th\_cal}$$

Each averaged quantity, $iRT_{avg}$, $iLW_{avg}$, $RW_{avg}$, $LW_{avg}$ is calculated as the sum over the th_cal frames of the ratio of each correspond k-th quantity, $iRT_k$, $iLW_k$, $RW_k$, $LW_k$, over the calibration value th_cal.

Then, the right and left lane positions, $LT_{ref}$ and $RT_{ref}$ respectively, are calculated as follows:

$$LT_{ref} = \left(iLT_{avg} + \frac{LW_{avg}}{2}\right) \times SS$$

$$RT_{ref} = \left(iRT_{avg} + \frac{RW_{avg}}{2}\right) \times SS$$

i.e., the temporal average of the right or left index $iRT_{avg}$, or $iLW_{avg}$ respectively, summed to the half of the related temporally averaged width, $RW_{avg}$ or $LW_{avg}$, such sum being multiplied by the stripe step SS.

The steps 340, 342, 344 together identify a reference data calculation procedure 330, which computes, receiving as inputs the edge points $EP_k$ of the frames $F_k$ acquired in time and the stripe HS information, the reference data RD, in particular right and left lane positions, $LT_{ref}$ and $RT_{ref}$. As better detailed in the following, such reference data RD calculation procedure 330 is performed not only at each first calibration, on the th_cal number of frames $F_k$, but also in the subsequent calibrations performed according to the re-calibration procedure 500 using as input different set of frames which are subsequently acquired. The set of acquired frame can also include only a single frame. Using a greater number of frames increases the precision of the estimate of the reference positions.

If the result of verification step 310 is negative, in a step 320 it is evaluated if the frame number k is equal to the calibration threshold th_cal. In the affirmative, step 344 is performed for a last time, generating the first lane reference data RD from the collected data CD, while in the negative, i.e., the frame number k is greater than the calibration threshold th_cal and therefore at least the first lane reference data RD have been supplied once to lane departure verification procedure 400, control passes to the lane departure verification procedure 400. In other words, the first calibration procedure 300 calculates a first time the lane reference data RD including such right and left lane reference position, $LT_{ref}$ and $RT_{ref}$ over a given number, the calibration threshold th_cal, of frames. Then, when frame number k is greater than the calibration threshold th_cal, such lane reference data RD calculated over the previous frames from 1 to k is maintained (when step 320 is negative).

The lane reference data RD obtained from the first calibration 300, including such right and left lane reference position, $LT_{ref}$ and $RT_{ref}$ however may not be maintained indefinitely, and, in particular, they have to be updated in a re-calibration procedure 500 which is performed during the acquisition of the sequence of frames PF. This step allows to continuously tune the lane reference data RD which can change, for instance, every time the vehicle V is running on a different type of road (highway, city road etc.) or every time there are works in progress on the road.

The re-calibration procedure 500 is accessed if the lane departure verification procedure 400 determines a status of no lane departure NLD. Then the re-calibration procedure 500 provides evaluating if the vehicle V maintains, for a fixed period, its position into the lane (no lane departure NLD status), so that the collected data CD are stable enough to allow computing reliable reference data RD. The procedure used for updating the lane reference position values is the same described with reference to the first lane calibration procedure 300, i.e., the procedure 330, including the edge point filtering 340, the data collection 342 and the lane reference data estimation 344.

Specifically the lane recalibration procedure 500 includes a step 510 of activation of a recalibration timer, which is performed if the lane departure verification procedure 400 gives a negative response, i.e., a no lane departure warning NLD state is outputted by the such lane departure verification procedure 400. In a verification step 520 is verified if the time counted at step 510, in a timer variable Timer_ReCal is greater that a time recalibration threshold $TH_1$. As for the other timers and counters discussed in the following, Timer_ReCal represents in fact a variable containing the value counted by the timer or counter In the affirmative—this meaning that the vehicle V has advanced only within the designated advancement lane, i.e., the central lane CL for a time corresponding to the time recalibration threshold $TH_1$, a threshold which can be set by the user or by default—a recalibration step 530 of recalculation of the lane reference data RD including such right and left lane reference position, $LT_{ref}$ and $RT_{ref}$ is performed. As already mentioned, the recalculation step 530 corresponds to the reference data calculation procedure 330, and receives as input the digital frames $F_k$ and the stripe HS information, performing on them the steps 340, 342, and 344 to obtain new reference data RDn.

The new reference data RDn are compared in a step 550 to the old reference data RDo, which are reference data calculated during the first calibration 300 or at a previous iteration of the recalibration 500 to check if the new reference data RDn are sufficiently close, within a given safety interval, to the previous old reference data RDo. In the negative, the excessive distance between new reference data RDn and old reference data RDo is considered a sign that the data of the last frames on for safety reasons which procedure 500 has been performed possibly were not valid, and old reference data RDo are retained, for safety reasons. In the affirmative, the new reference data RDn calculated at step 400 are supplied in a step 550 as calibration output instead of the output of the first calibration 300, as updated reference data RDu, replacing the reference data RD supplied by procedure 330.

The lane departure verification procedure 400 is performed in real time, preferably on each frame $F_k$ (with index k greater than the first calibration threshold th_cal) acquired by the microprocessor module MP through the camera DC, and includes estimating a center of the reference lane $C_{ref}$ on the basis of the right and left lane positions, $LT_{ref}$ and $RT_{ref}$, for instance as $(LT_{ref}+RT_{ref})/2$.

Then, among the filtered edge points $EPS_k$, two edge points are selected with respect to the center of the reference lane $C_{ref}$, a right edge point $P_{RT}$, which is the first edge point to the right of the center of the reference lane $C_{ref}$, and a left edge point $P_{LT}$, which is the first edge point to the left of center of the reference lane $C_{ref}$ to perform the lane departure verification. Also the status of the transition is used to determine the lane departure verification.

With reference to FIGS. 10A, 10B, 10C, in FIG. 10A are shown the filtered edge points $EPS_k$ in the stripe HS in a case in which the vehicle V is in the central lane CL and thus there is a state of no lane departure. In FIG. 10B it is shown the case in which the vehicle V is steering to the right, therefore there is a status of right lane departure NAL. In FIG. 10C it is shown the case in which the vehicle V is steering to the left, therefore there is a status of left lane departure The lane departure verification procedure 400 handles the lane departure warning status through two static variables, LTt and RTt, which can define three states, no lane departure NLD, left lane departure LLD and right lane departure RLD, the two latter corresponding to a lane departure status YLD.

The possible values of the two static variables, LTt and RTt, are:
$LT_t=0, RT_t=0 \rightarrow$ no lane departure status NLD
$LT_t=1, RT_t=0 \rightarrow$ left lane departure status LLD
$LT_t=0, RT_t=1 \rightarrow$ right lane departure status RLD.

Figure 11:
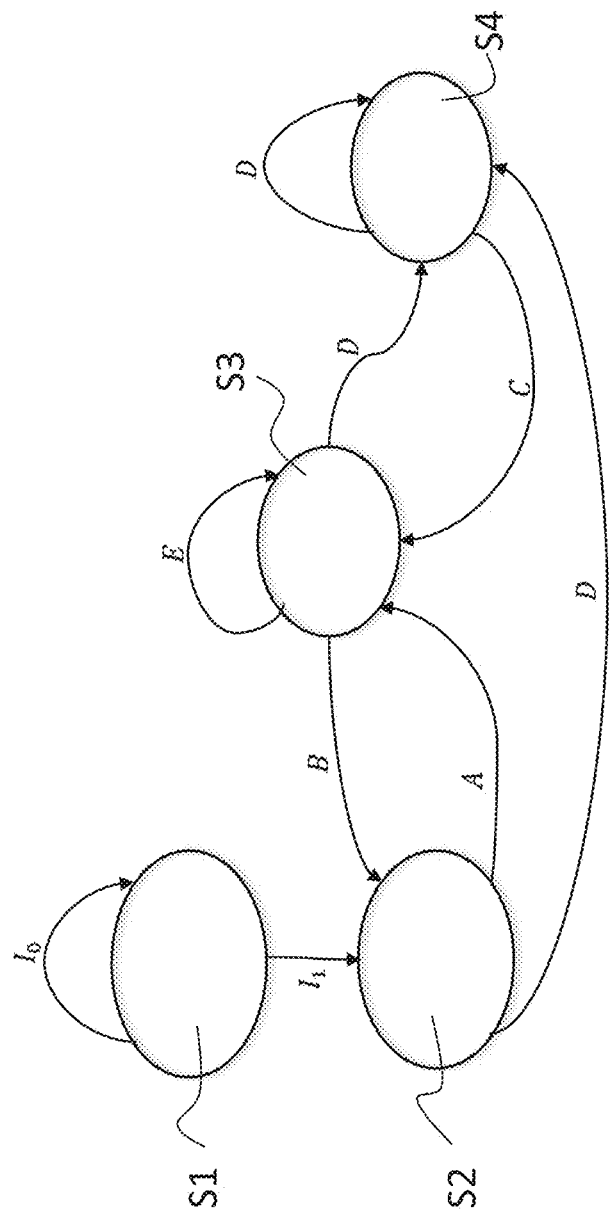
FIG. 11 shows a finite state machine implementing the method here described.

The new state of the system is determined by considering the previous state and other conditions as indicated in FIG. 11, where a finite state machine representing the control applied by the method here described is shown.

For each j row of the image frame $F_k$ in the horizontal stripe HS, i.e., in the example this corresponds to 20 rows since the stripe height SH is 20, are evaluated one of four conditions CR1, CR2, CR3, CR4. For each verification is increased a counter, in particular a right counter LT_LDW_NUM or a left counter RT_LDW_NUM.

The first condition CR1 evaluated for a given j-th row is:
a) $P_{LT}(j) > LT_{ref}$ and $P_{LT}(j) < C_{ref}$
b) $P_{LT}(j)) - LT_{ref} > TH_{tol}$
c) ($LT_t=0$ and $RT_t=0$) or ($RT_t=0$ and $LT_t=1$).

The subcondition a) identifies if the points $P_{LT}(j)$ belonging to the first feature (i.e., the first set of adjacent non null edge points) identified in the stripe HS to the left of the reference center $C_{ref}$, lie in the interval defined by the left reference $LT_{ref}$ and the reference center $C_{ref}$. The subcondition (b) means that the left counter LT_LDW_NUM is increased if the lane departure of the vehicle V is sizeable, i.e., if $LT_{ref}=PLT$ (j) the vehicle V is exactly into the lane. If $LT_{ref} < PLT$ (j), if this is true only for a distance of a few pixels, there is a left departure, which is however too small to already enter in a lane departure status, i.e to increase the counter. Then, only if the departure is greater than a tolerance threshold, $TH_{tol}$, the counter is increased.

The subcondition c) verifies if the current state of the system, as identified by the current value of the static variables $LT_t$, $RT_t$ is no lane departure status NLD or left departure LLD. In other words the subcondition c) takes in account the current state of the system, meaning either the vehicle V has last been evaluated as, since the current state indicated is $LT_t=0, RT_t=0$, in no lane departure status NLD, or the vehicle V has last been evaluated, since previous state indicated was $LT_t=0, RT_t=1$, in left departure status LLD.

In case the first condition CR1 is verified, i.e., all its sub-conditions are verified, the left counter LT_LDW_NUM is increased by one.

The second condition CR2 is:
a) $P_{LT}(j) > LT_{ref}$ and $P_{LT}(j) < C_{ref}$
b) $P_{LT}(j) - LT_{ref} > TH_{tol}$
c) ($LT_t=0$ and $RT_t=1$)

The second condition CR2 corresponds to a case where are verified the same sub-conditions (a) and (b) of condition CR1, but not sub-condition (c), since the system is set in the right departure state RLD.

This is the typical case of a vehicle V that changes lane in a multi-lane road. When the vehicle V moves toward right from central lane CL and starts a right departure crossing the right line marking RLS, then the system passes in the right departure state RRD. If the vehicle V continues this movement till to reach the other lane, right lane RB, it happens that, despite the car is moving to the right, condition CR1 is verified. The only difference is that the system is already set in the right departure state RLD. But in this case the counter to be increased is the right counter RT_LDW_NUM.

Thus, in case the second condition CR2 is verified the right counter RT_LDW_NUM is increased by one.

The third condition CR3 is:
a) $P_{RT}(j) < RT_{ref}$ and $P_{RT}(j) > C_{ref}$
b) $RT_{ref} - P_{RT}(j) > TH_{tol}$
c) ($LT_t=0$ and $RT_t=0$) or ($LT_t=0$ and $RT_t=1$).

The third condition CR3 represents a right departure condition so that the right counter RT_LDW_NUM is increased.

The sub condition (b) means that the right counter RT_LDW_NUM is increased if the departure is sizeable, $TH_{tol}$ being the same tolerance threshold as above, but referred to a distance between the right left edge point $P_{RT}$ and the right reference lane $RT_{ref}$.

The sub condition (c) means that the current state of the system can be no lane departure NLD or «right departure RLD.

In case the third condition CR3 is verified the right counter RT_LDW_NUM is increased by one.

The fourth condition CR4 is:
a) $P_{RT}(j) < RT_{ref}$ and $P_{RT}(j) > C_{ref}$
b) $RTref - (P_{RT}(j) > TH_{tol}$
c) ($LT_t=1$ and $RT_t=0$).

As for condition CR2, this is a case where are verified the same sub-conditions (a) and (b) of condition CR3, but not sub-condition (c), since the system is set in the left departure state LLD.

This is the typical case of a vehicle V that changes lane in a multi-lane road. When the vehicle V moves toward left from central lane CL and starts a right departure crossing the left line marking LLS, then the system passes in the left departure state LRD. If the vehicle V continues this movement till to reach the other lane, left lane LB, it happens that, despite the car is moving to the left, condition CR3 is verified. The only difference is that the system is already set in the left departure state LLD. But in this case the counter to be increased is the left counter LT_LDW_NUM.

In case the fourth condition CR4 is verified, thus the left counter LT_LDW_NUM is increased by one.

Knowing the values of the right counter LT_LDW_NUM and of the left counter RT_LDW_NUM, the system can verify if there is or not a lane departure state.

Summarizing, by verifying the four conditions CR1, CR2, CR3, C4 for each row j, or horizontal line, of the stripe HS, if a segment of line marking lies withing the center and the respective reference lane position, a respective counter is made to increase, substantially counting the points, i.e., the sub-areas, that compose the segment. As described in the following the count value respectively reached by the left and right counter over all the rows j of the stripe HS is compared to a count threshold, th_num, to decide if the non null points are really a segment of marking line RLS or LLS. It is underlined that the value th_num not necessarily correspond to the stripe height SH, but, in particular it can be a lower value, to obtain a quicker recognition of the marking line.

Now, with reference to FIG. 11, a finite state machine which embodies the above described method will be described. The finite state machine in FIG. 11 includes four possible state of the system: a initialization state S1, a lane calibration state S2, a no lane departure (inlane) state S3 and a lane departure state S4.

The system, i.e., which mainly represented by the microprocessor MP, cooperating with the sensors providing input, in particular the camera DC, and the peripheral providing outputs for the alert AL, such as a display or an acoustic speaker, enters the inizialization state S1 only once, the first time it is turned on (or after it is reset), for instance at the key-on of the vehicle V or when the vehicle V starts moving. In this condition, the system starts to collect (operations 340, 342) the data relative to the stripe HS, and that collection continues till a timer, a first calibration timer Timer_FirstCal, which calculates a time elapsed from when initialization state S1 has been entered, reaches a first calibration time threshold $TH_0$. After the first calibration time threshold $TH_0$ value is reached, the system is ready to change its state by passing to the lane calibration state S2. This condition is indicated by setting a boolean variable, a first calibration flac $T_{FC}$, equal to one ($T_{FC}=1$).

It is therefore:
Timer_FirstCal<$TH_0$ then $T_{FC}=0$
Timer_FirstCal=$TH_0$ then $T_{FC}=1$ For what regards, the lane calibration state S2, the calibration (i.e., procedure 330 or 530) is performed continuously. The first calibration 300 is performed when the system leaves the state of initialization S1. The other calibrations are performed every time the system verifies that the vehicle V stays into a lane for a fixed period (Timer_ReCal). The recalibrations are performed to update the reference data RD, as mentioned this being in particular useful in case the vehicle V changes type of road (highway, city roads etc.)

To handle the re-calibrations, a timer, the recalibration timer Timer_ReCal indicated in FIG. 5, which calculate (operation 510) a time elapsed from the no lane departure warning state S2 is used. When the recalibration timer Timer_ReCal reaches a recalibration threshold $TH_1$ (this is verified in operation 520) then the system performs the recalibration (procedure 530, corresponding to procedure 330). In particular if the recalibration timer timerReCal is above the recalibration threshold $TH_1$, a recalibration flag $T_{RC}$ is set to logic one. More in detail:
Timer_ReCal<$TH_1$ then $T_{RC}=0$
Timer_ReCal=$TH_1$ then $T_{RC}=1$ For what regards the lane departure state S4, the two counters LT_LDW_num and RT_LDW_num are compared with the count threshold $TH_{num}$ to identify a potential lane departure of the vehicle V. Once a lane departure is verified, two boolean variables L and R to indicate the left (L=1) or the right (R=1) departure are used. $TH_{num}$ is a threshold of the counter, above which the static variable L or R respectively are set to logic one.

More in detail
If LT_LDW_NUM<$TH_{num}$, then L=0
If RT_LDW_NUM<$TH_{num}$, then R=0
If LT_LDW_NUM≥$TH_{num}$, then L=1
If RT_LDW_NUM≥$TH_{num}$, then R=1

The variables L and R here and in the following correspond to the static variables $LT_t$ e $RT_t$.

The system enters in this state every time it is verified a departure from the left or right lane. Using the previous defined boolean variable L and R, we can represent this state as follows:
((L=0) and (R=1) or ((L=1) and (R=0))

Summarizing, also with reference to the previous discussed lane departure verification 400, LT_LDW_num indicates the count variable of a counter which represents the number of rows into the stripe HS where it is verified a left lane departure. RT_LDW_num indicates the count variable of a counter which represents the number of rows into the stripe where it is verified a right lane departure. L is a boolean variable used to indicate if the system is in the state of left lane departure (L=1). R is a boolean variable used to indicate if the system is in the state of right lane departure (R=1). As already indicated with reference to procedure 400, count threshold $TH_{num}$ is used to select/activate a lane departure warning. For example, if the LT_LDW_num counter is greater than the count threshold $TH_{num}$ then the left lane departure warning LLD is activated. The activation of a left lane departure is represented by setting the boolean variable L equal to one (L=1). In a similar way the activation of the right departure warning RLD is represented by setting to one the R boolean variable (if RT_LDW_num is greater than count threshold THnum, then R=1)

For what regards, the in lane state S3, the system enters in this state every time the vehicle V is into the lane for a fixed period, indicated by a in lane threshold $TH_2$. Also for this state it is used a timer counting a in lane timer variable Timer_InLane, which calculate a time elapsed from the return to inlane state S3 from lane departure state S4. If the timer variable Timer_InLane is greater than lane threshold $TH_2$, a in lane flag $T_{IL}$ is set to logic one.

More in detail:
Timer_InLane<$TH_2$ then $T_{IL}=0$
Timer_InLane=$TH_2$ then $T_{IL}=1$ It must be noted that the threshold for the recalibration timer variable timerReCal is set greater than the threshold for in lane timer variable Timer_InLane, so that the recalibration 500 cannot be started before the time threshold for lane timer variable Timer_InLane is exceeded.

The machine operates as follows.

In the initialization state S1 event $I_0$ is performed while the first calibration flag $T_{FC}$ is set to logic zero:
$I_0 \rightarrow T_{FC}=0$ When the first calibration flag $T_{FC}$ is set to logic one, since the first calibration time is expired (Timer_FirstCal=TH$_0$) then transition I$_1$ to calibration state S2 is performed.

I$_1$→T$_{FC}$=1

If the vehicle V stays in the lane, L=0 and R=0, therefore a transition to inlane state S3 is performed

A→(L=0)&(R=0)

If the recalibration flag $T_{RC}$ is set to one, i.e., the TimerFirstCal has expired, and variables L and R indicates no lane departure, then a transition B from state S3 to calibration state S2 is performed.

B→(L=0)&(R=0)&T$_{RC}$=1

If the inlane flag $T_{IL}$ is set to one and variables L and R indicates no lane departure, from lane departure state S4 a transition C to no departure state S3 is performed.

C→L=0)&(R=0)&T$_{IL}$=1

If in state S3 a right departure is detected or a left departure is detected a transition to state S4 is performed from calibration state S2, from in lane state S3 and also from lane departure state S4 (i.e., the system stays in state S4).

D→((L=0)&(R=1)|((L=1)&(R=0)

If in lane state S3 the recalibration flag $T_{RC}$ is set to zero, i.e., the TimerFirstCal has not yet expired, a cycle event E is performed

E→→(L=0)&(R=0)&T$_{RC}$=0;

The alert AL generate by the procedure 600, following the reception by the procedure 400 of a status warning YLD, which can correspond to a left departure warning LLD or a right departure warning RLD, can be of different type, as a wheel vibration or an acoustic or a lighting alert. For instance an alert AL can be obtained superimposing on a image taken by the camera DC, which is displayed inside the vehicle V on a display on the dashboard or in another suitable place in the vehicle V, graphical symbols that appear or blink or change color when a lane departure takes place. Also if a left departure warning LLD is received can appear or blink or change color a corresponding left symbol, while if a right departure warning RLD is received can appear or blink or change color a corresponding right symbol.

The method here described can be extended to multi-lane detection, i.e., to detect the position of lanes adjacent to the main one, in the example the central lane CL. In this case it is necessary to set the stripe HS position taking care of capturing all the lanes as shown in FIG. 12. The knowledge of further lanes can be used in applications where the goal is to detect, for example, the precence/distance of cars crossing in adjacent lanes. As shown in FIG. 12, setting the first line 1SL at row 280 the four lanes LB, LLS, RLS, RB do not lay all within the horizontal stripe HS. Shifting the first line 1SL up to row 235, then a new horizontal stripe HS' is obtained within which the four lanes LB, LLS, RLS, RB all lay. In FIG. 13 are shown the filtered edge points falling withing the new horizontal stripe HS'.

The solutions disclosed herein have thus significant advantages with respect to the known solutions.

The proposed method allows real time processing exploiting the availability of embedded edge extractor in the image processing module, by very simple operations. The LDW is an application belonging to the Smart Driver solutions for automotive. It helps the driver to maintain the car into the lane. The application is based exclusively on the edge points.

The method can be applied in automotive, ADAS, Smart Driving and Safe Driving applications.

The method here described has been implemented in ANSI-C code and tested in different scenarios, varying camera lenses (linear, wide angle), sensor devices, such as Samsung S4, Samsung Galaxy TABS, Nexus 5, and light condition (sunny, foggy, rainy and nightly). The method can process ~25000 fps by using an ARM Cortex-A15 r3, single core @ 2.3 GHz, like the one implemented by the STV0991 image processor.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A method for generating a lane departure warning in a vehicle, the method comprising:
    acquiring a plurality of frames of a digital image of a road on which the vehicle is traveling, the digital image of the road including an image of a lane within which the vehicle is traveling and of marking lines of the lane;
    performing a lane calibration procedure on a set of acquired frames to obtain reference positions of the lane, the lane calibration procedure including filtering edge points of the image frame belonging to an area of a horizontal stripe of the frame including a plurality of rows of the frame, wherein performing a lane calibration procedure comprises updating the reference positions of the lane in response to determining that no lane departure status is detected for a given recalibration time;
    for each of the acquired frames, extracting edge points of the frame, performing a lane departure verification procedure that includes identifying points in a frame representative of a position of the lane marking lines, and comparing the position of the points to the reference positions of the lane, the reference positions of the lane being obtained by the lane calibration procedure; and
    generating a lane departure alert when a lane departure status is detected by the lane departure verification procedure.

2. The method according to claim 1, wherein the lane calibration procedure comprises:
    collecting a value and position of accumulating filtered edge points over the set of acquired frames;
    calculating a distribution of the filtered edge points along a width of the road;
    extracting an estimate of the marking lines position; and
    marking a line width from the distribution.

3. The method according to claim 2, wherein the lane calibration procedure further comprises calculating the reference positions of the lane as a function of the estimate of the marking line position and marking line width temporally averaged over a number of frames in the set of acquired frames.

4. The method according to claim 1, wherein the lane calibration procedure includes a first lane calibration procedure performed on a given number of acquired frames.

5. A computer program product stored in a non-transitory memory that can be loaded into a memory of at least one computer, the computer program product comprising portions of software code for implementing the method according to claim 1 when the software code is executed on the at least one computer.

6. The method according to claim 1, further comprising obtaining an estimate of the marking lines position by taking the first non-null filtered edge points to the left and right of a center of the horizontal stripe.

7. The method according to claim 6, further comprising obtaining marking line widths by counting adjacent filtered edge points that are not null.

8. The method according to claim 7, wherein the lane calibration procedure comprises:
collecting a value and position of the accumulating filtered edge points over the set of acquired frames;
calculating a distribution of the filtered edge points along a width of the road;
extracting an estimate of the marking lines position;
marking a line width from the distribution;
calculating the reference positions of the lane as a function of the estimate of the marking lines position; and
marking the line width temporally averaged over the number of frames in the set of acquired frames.

9. The method according to claim 8, wherein the collecting comprises:
dividing the horizontal stripe in a plurality of vertical sectors of a given width and associating each vertical sector to a respective index;
calculating the number of filtered edge points in each vertical sector; and
obtaining the estimate of the marking lines position taking the first non-null filtered edge points to the left and right of a center of the horizontal stripe including taking the index of the identified first left and right sector as the estimate of the marking lines position.

10. The method according to claim 9, wherein the marking line width is obtained by counting the adjacent filtered edge points that are not null by calculating a number of sectors adjacent to the first non-null sector having a non-null number of filtered edge points;
wherein the lane calibration procedure includes a first lane calibration procedure performed on a given number of acquired frames; and
wherein calculating the reference positions of the lane includes calculating as a function of the estimate of the marking lines position and marking line width temporally averaged over the given number of frames and also of the given width of the sectors.

11. The method according to claim 1, wherein the lane departure verification procedure compares the position of the points to reference positions of the lane by
estimating a center of the reference lane based on the reference positions;
selecting, among the filtered edge points, two edge points with respect to the center of the reference lane as a first edge point to the right of the center of the reference lane and a first edge point to the left of center of the reference lane to perform the lane departure verification;
defining a left variable and a right variable that define states of departure;
evaluating, for all the rows of the horizontal stripe, a plurality of conditions that are a function of the center of the reference lane, a first edge point to the right and a previous state of departure;
setting a new value of the left variable and right variable according to the number of rows satisfying the conditions; and
evaluating a new lane departure status.

12. The method according to claim 11, wherein the states of departure comprise states of no lane departure, left lane departure and right lane departure of the vehicle.

13. A system for generating a lane departure warning in a vehicle, the system comprising:
a microprocessor; and
a non-transitory memory coupled to the microprocessor and storing software code to be executed by the microprocessor, the software code including instructions for performing a method comprising:
acquiring a plurality of frames of a digital image of a road on which the vehicle is traveling, the digital image of the road including an image of a lane within which the vehicle is traveling and of marking lines of the lane;
performing a lane calibration procedure on a set of acquired frames, the lane calibration procedure including filtering edge points of the image frame belonging to an area of a horizontal stripe of the frame including a plurality of rows of the frame, wherein performing a lane calibration procedure comprises updating the reference positions of the lane obtained by the lane calibration procedure if no lane departure status is detected for a given recalibration time;
for each of the acquired frames, extracting edge points of the frame, performing a lane departure verification procedure that includes identifying points in a frame representative of a position of the lane marking lines, and comparing the position of the points to reference positions of the lane, the reference positions of the lane being obtained by the lane calibration procedure; and
generating a lane departure alert when a lane departure status is detected by the lane departure verification procedure.

14. The system according to claim 13, further comprising an alert device coupled to receive the lane departure alert, the alert device comprising a vibration device, an audio device or a light.

15. The system according to claim 13, further comprising a video camera configured to acquire the plurality of frames.

16. The system according to claim 15, wherein the lane calibration procedure comprises:
collecting a value and position of accumulating filtered edge points over the set of acquired frames;
calculating a distribution of the filtered edge points along a width of the road;
extracting an estimate of the marking lines position; and
marking a line width from the distribution.

17. A system for generating a lane departure warning in a vehicle, the system comprising:
a microprocessor; and
a non-transitory memory coupled to the microprocessor and storing software code to be executed by the microprocessor, the software code including instructions for performing a method comprising:
acquiring a plurality of frames of a digital image of a road on which the vehicle is traveling, the digital image of the road including an image of a lane within which the vehicle is traveling and of marking lines of the lane;
filtering edge points of the image frame belonging to an area of a horizontal stripe of the frame including a plurality of rows of the frame;
collecting a value and position of accumulating filtered edge points over the set of acquired frames;
calculating a distribution of the filtered edge points along a width of the road;

extracting an estimate of the marking lines position by taking a first positing that is a non-null filtered edge point to the left of a center of the horizontal stripe and a first positing that is a non-null filtered edge point to the right of the center of the horizontal stripe;

marking a line width from the distribution;

for each of the acquired frames, extracting edge points of the frame, performing a lane departure verification procedure that includes identifying points in a frame representative of a position of the lane marking lines, and comparing the position of the points to reference positions of the lane; and generating a lane departure alert when a lane departure status is detected by the lane departure verification procedure.

18. The system according to claim 17, further comprising an alert device coupled to receive the lane departure alert, the alert device comprising a vibration device, an audio device or a light.

19. The system according to claim 17, further comprising a video camera configured to acquire the plurality of frames.

* * * * *